US011186295B2

(12) United States Patent
Kahn

(10) Patent No.: US 11,186,295 B2
(45) Date of Patent: Nov. 30, 2021

(54) VEHICLE WITH ESCAPE FEATURE USING SYNTHESIZED VEHICLE VIEW

(71) Applicant: Michael Robert Kahn, Cherry Hill, NJ (US)

(72) Inventor: Michael Robert Kahn, Cherry Hill, NJ (US)

(73) Assignee: VERIPAT, LLC, Mount Holly, NJ (US)

( * ) Notice: Subject to any disclaimer, the term of this patent is extended or adjusted under 35 U.S.C. 154(b) by 185 days.

(21) Appl. No.: 16/693,347

(22) Filed: Nov. 24, 2019

(65) Prior Publication Data

US 2020/0094852 A1    Mar. 26, 2020

Related U.S. Application Data

(63) Continuation-in-part of application No. 15/851,811, filed on Dec. 22, 2017, now Pat. No. 10,520,946.

(51) Int. Cl.
| | |
|---|---|
| *B60W 50/14* | (2020.01) |
| *G05D 1/00* | (2006.01) |
| *B60Q 5/00* | (2006.01) |
| *B60Q 1/52* | (2006.01) |
| *B60W 30/18* | (2012.01) |
| *B60W 10/04* | (2006.01) |
| *B60W 10/20* | (2006.01) |
| *B60W 10/22* | (2006.01) |
| *B60W 10/30* | (2006.01) |
| *B60W 50/00* | (2006.01) |

(52) U.S. Cl.
CPC ............... *B60W 50/14* (2013.01); *B60Q 1/52* (2013.01); *B60Q 5/005* (2013.01); *B60W 10/04* (2013.01); *B60W 10/20* (2013.01); *B60W 10/22* (2013.01); *B60W 10/30* (2013.01); *G05D 1/0061* (2013.01); *G05D 1/0088* (2013.01); *B60W 2050/0074* (2013.01); *B60W 2050/146* (2013.01); *B60W 2710/20* (2013.01); *B60W 2710/22* (2013.01); *B60W 2710/30* (2013.01); *B60W 2720/10* (2013.01); *G05D 2201/0213* (2013.01)

(58) Field of Classification Search
CPC ............... G05D 1/0214; G05D 1/0088; G05D 2201/0213; B60K 28/14; G08G 1/16; G07C 5/008; B60W 50/14; B60W 30/18; B60W 10/04; B60W 10/20; B60W 2050/0074; B60W 2050/146
See application file for complete search history.

(56) References Cited

U.S. PATENT DOCUMENTS

| | | | |
|---|---|---|---|
| 6,662,106 B2 | 12/2003 | Evans | |
| 6,812,851 B1* | 11/2004 | Dukach | .................... G08G 1/01 340/815.4 |

(Continued)

*Primary Examiner* — Michael J Zanelli

(57) ABSTRACT

Embodiments of the present invention provide an autonomous vehicle with an emergency escape mode. When fleeing a scene is critical, embodiments provide an AV that can operate in an emergency escape mode (EEM) to enable the AV to flee a scene, protecting its occupants. Typically, a passenger or operator invokes EEM in an AV when they are in imminent danger from criminal activity such as carjacking. A least resistance route can be computed to determine an escape route that provides for reduced chance of injury and/or increased probability of a successful escape.

20 Claims, 17 Drawing Sheets

(56) References Cited

U.S. PATENT DOCUMENTS

| | | | | |
|---|---|---|---|---|
| 7,761,544 | B2* | 7/2010 | Manasseh | G07C 5/008 709/223 |
| 8,996,224 | B1* | 3/2015 | Herbach | G05D 1/0044 701/23 |
| 9,307,217 | B1* | 4/2016 | Day | H04N 9/79 |
| 9,475,496 | B2* | 10/2016 | Attard | B60W 50/12 |
| 9,809,196 | B1* | 11/2017 | Penilla | B60L 50/66 |
| 10,198,942 | B2 | 2/2019 | Ginsberg et al. | |
| 10,870,428 | B2* | 12/2020 | Foltin | B60W 30/09 |
| 11,040,661 | B2* | 6/2021 | Shidochi | B60R 1/00 |
| 2001/0014849 | A1 | 8/2001 | King et al. | |
| 2012/0281878 | A1* | 11/2012 | Matsuda | G06T 7/75 382/103 |
| 2015/0346337 | A1* | 12/2015 | Jung | G01S 13/931 342/55 |
| 2016/0252903 | A1* | 9/2016 | Prokhorov | B60W 40/02 701/23 |
| 2017/0297588 | A1* | 10/2017 | Doshi | G06F 21/32 |
| 2018/0120837 | A1* | 5/2018 | Regmi | A61B 5/01 |
| 2018/0301029 | A1* | 10/2018 | Nilsson | G08G 1/096855 |

* cited by examiner

VEHICLE WITH ESCAPE FEATURE USING SYNTHESIZED VEHICLE VIEW

FIELD OF THE INVENTION

The present invention relates generally to vehicles, and more particularly, to vehicles with autonomous feature override.

BACKGROUND

Cars are rapidly becoming more autonomous. Features such as adaptive cruise control with lane keeping technology exist on currently available cars. Improvements in processing power and sensor technology, along with vehicle to vehicle communication and vehicle to infrastructure communication are paving the way for more vehicles with increased autonomy.

SUMMARY

Embodiments can include a vehicle, comprising: a drive train; a steering mechanism; an onboard computer configured to control the drive train and steering mechanism, an emergency escape trigger coupled to the onboard computer; wherein the computer comprises: a processor; a memory coupled to the processor; wherein the memory contains instructions, that when executed by the processor, cause the processor to: receive an emergency activation signal based on one or more indications from the emergency escape trigger; obtain a user-preferred path from a synthesized-view vehicle display system; deactivate a collision avoidance system; and direct the vehicle along the user-preferred path by controlling the drive train and the steering mechanism.

Embodiments can further include a vehicle wherein the memory further contains instructions, that when executed by the processor, cause the processor to: determine a least resistance path; and receive a user selection between the user-preferred path and the least resistance path.

Embodiments can further include a vehicle wherein the memory further contains instructions, that when executed by the processor, cause the processor to: receive a user prohibition boundary from the synthesized-view vehicle display system; recompute the least resistance path based on the user prohibition boundary; and display the recomputed least resistance path on the synthesized-view vehicle display system.

Embodiments can further include a vehicle wherein the steering mechanism includes a steering wheel, and wherein the emergency escape trigger comprises a button affixed to the steering wheel.

Embodiments can further include a vehicle comprising a vehicle floor, and wherein the emergency escape trigger comprises a button affixed to the vehicle floor.

Embodiments can further include a vehicle wherein the memory further contains instructions, that when executed by the processor, cause the processor to configure a suspension system of the vehicle to an elevated configuration in response to receiving the emergency activation signal.

Embodiments can further include a vehicle wherein the memory further contains instructions, that when executed by the processor, cause the processor to disable an airbag immobilization interlock in response to receiving the emergency activation signal.

Embodiments can further include a vehicle wherein the memory further contains instructions, that when executed by the processor, cause the processor to initiate a video recording upon receiving the emergency activation signal.

Embodiments can further include a vehicle wherein the memory further contains instructions, that when executed by the processor, cause the emergency escape trigger to be activated by a voice command.

Embodiments can further include a vehicle wherein the memory further contains instructions, that when executed by the processor, cause the processor to activate an external audible alert upon receiving the emergency activation signal.

Embodiments can further include a vehicle wherein the memory further contains instructions, that when executed by the processor, cause the processor to activate external visual alert upon receiving the emergency activation signal.

Embodiments can further include a vehicle, comprising: a drive train; a steering mechanism; an onboard computer configured to control the drive train and steering mechanism, an emergency escape trigger coupled to the onboard computer; wherein the computer comprises: a processor; a memory coupled to the processor; wherein the memory contains instructions, that when executed by the processor, cause the processor to: receive an emergency activation signal based on one or more indications from the emergency escape trigger; determine a least resistance path render the least resistance path on a synthesized-view vehicle display system; deactivate a collision avoidance system; and direct the vehicle along the user-preferred path by controlling the drive train and the steering mechanism.

Embodiments can further include a vehicle wherein the memory further contains instructions, that when executed by the processor, cause the processor to: obtain a user-preferred path from the synthesized-view vehicle display system; and receive a user selection between the user-preferred path and the least resistance path.

Embodiments can further include a vehicle wherein the memory further contains instructions, that when executed by the processor, cause the processor to: receive a user prohibition boundary from the synthesized-view vehicle display system; recompute the least resistance path based on the user prohibition boundary; and display the recomputed least resistance path on the synthesized-view vehicle display system.

Embodiments can further include a vehicle wherein the steering mechanism includes a steering wheel, and wherein the emergency escape trigger comprises a button affixed to the steering wheel.

Embodiments can further include a vehicle wherein the memory further contains instructions, that when executed by the processor, cause the processor to configure an adjustable-height suspension system to increase a ground clearance of the vehicle in response to receiving the emergency activation signal.

Embodiments can further include a vehicle further comprising a vehicle floor, and wherein the emergency escape trigger comprises a button affixed to the vehicle floor.

Embodiments can further include a vehicle wherein the memory further contains instructions, that when executed by the processor, cause the processor to configure a suspension system of the vehicle to an elevated configuration in response to receiving the emergency activation signal.

Embodiments can further include a vehicle wherein the memory further contains instructions, that when executed by the processor, cause the processor to disable an airbag immobilization interlock in response to receiving the emergency activation signal.

Embodiments can further include a vehicle wherein the memory further contains instructions, that when executed by the processor, cause the processor to initiate a video recording upon receiving the emergency activation signal.

Embodiments can further include a vehicle wherein the memory further contains instructions, that when executed by the processor, cause the processor to stream the video recording to a third party upon receiving the emergency activation signal.

Embodiments can further include a computer-implemented method for performing an emergency maneuver in a vehicle, comprising: receiving an emergency activation signal; determining a safety zone for the vehicle; detecting one or more pedestrians within the safety zone; obtaining a user-preferred path from a synthesized-view vehicle display system; determining a least resistance path based on the pedestrians within the safety zone; deactivating a collision avoidance system; receiving a user path selection, wherein the user path selection consists of a path selected from the group of user-preferred path and least resistance path; and directing the vehicle on the user path selection.

Embodiments can further include receiving a user prohibition boundary from the synthesized-view vehicle display system; recomputing the least resistance path based on the user prohibition boundary; and displaying the recomputed least resistance path on the synthesized-view vehicle display system.

Embodiments can further include disabling an airbag immobilization interlock in response to receiving the emergency activation signal.

Embodiments can further include initiating a video recording upon receiving the emergency activation signal.

Embodiments can further include streaming the video recording to a third party upon receiving the emergency activation signal.

Embodiments can further include activating an external audible alert upon receiving the emergency activation signal.

Embodiments can further include activating an external visual alert upon receiving the emergency activation signal.

Embodiments can further include a computer program product embodied in a computer-readable medium, comprising machine instructions, that when executed by a processor, cause the processor to: receive an emergency activation signal based on one or more indications from the emergency escape trigger; obtain a user-preferred path from a synthesized-view vehicle display system; deactivate a collision avoidance system; and direct the vehicle along the user-preferred path by controlling the drive train and the steering mechanism.

Embodiments can further include a computer program product including machine instructions, that when executed by a processor, cause the processor to send an emergency escape warning message upon receiving the emergency activation signal.

Figure 1:
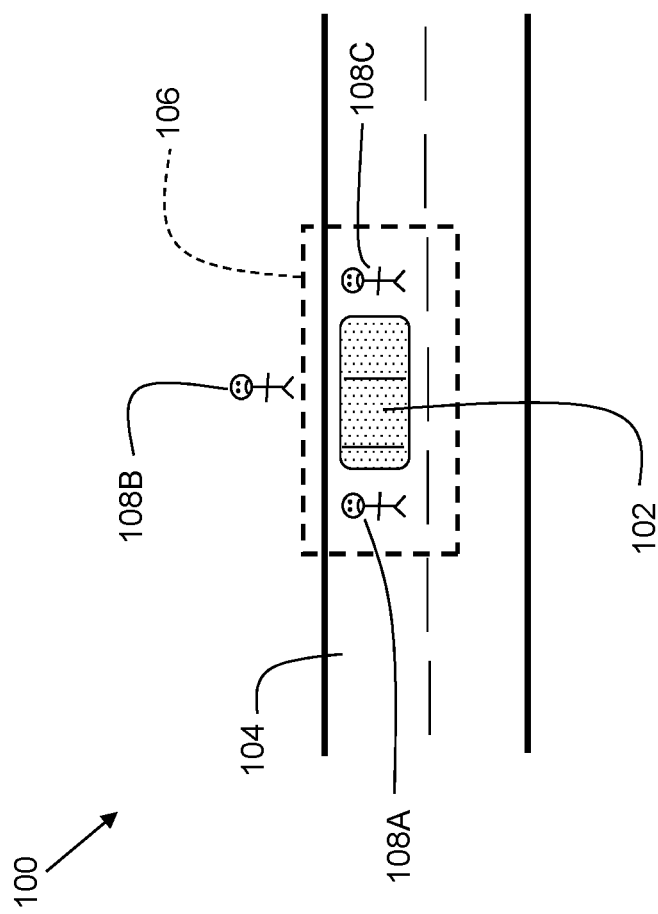
FIG. 1 shows a vehicle with autonomous features being carjacked.

The drawings are not necessarily to scale. The drawings are merely representations. The drawings are intended to depict only example embodiments of the current disclosure, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Vehicles with autonomous features are equipped with sensors and computers to facilitate full or partial autonomous driving. In some cases, conventional automobiles are outfitted with autonomous features such as automatic braking. For the purposes of this disclosure, vehicles with at least one autonomous feature including automatic braking based on pedestrian or other object detection are referred to as autonomous vehicles, even though they may not be fully autonomous. The autonomous vehicle (AV) is typically programmed to avoid collision, and in particular, pedestrian detection specifically is intended to prevent an AV from striking a pedestrian under any circumstances.

While in most cases, this mode of operation is highly desirable, the policies of AVs in the current state of the art create vulnerabilities in certain situations. For example, if an AV is programmed to avoid contact with a pedestrian under any circumstance, then it becomes possible for a team of criminals to immobilize an AV simply by having one person stand in front of the vehicle and another person stand behind the vehicle. That leaves the occupants of the AV vulnerable to theft and bodily harm from criminals. Thus, a team of four or five people can immobilize the vehicle simply by surrounding it, with the occupants unable to flee because the AV is programmed to avoid pedestrian contact under any circumstance. Furthermore, a group of people wishing to cause malice could place a large, lightweight object such as a large cardboard box in front of an autonomous vehicle to stop it in its tracks, leaving its occupants vulnerable to crimes.

Embodiments of the present invention provide an autonomous vehicle with an emergency escape mode. When fleeing a scene is critical, embodiments provide an AV that can operate in an emergency escape mode (EEM) to enable the AV to flee a scene, protecting its occupants. Typically, a passenger or operator invokes EEM in an AV when they are in imminent danger from criminal activity such as carjacking. For the purposes of this disclosure, an autonomous vehicle (AV) includes a fully autonomous vehicle and/or a partially autonomous vehicle. For example, a vehicle that provides conventional driver control via steering wheel, brakes, and accelerator, but also provides automatic braking upon detection of pedestrians or other objects is also considered an autonomous vehicle for the purposes of this disclosure.

FIG. 1 shows an example 100 a vehicle with autonomous features being carjacked. In the example 100, an autonomous vehicle 102 is on a road 104. Multiple people, indicated as 108A, 108B, and 108C are robbing the occupants of vehicle 102. Person 108A stands at the rear of the vehicle 102. Person 108C stands at the front of the vehicle 102. Person 108A and person 108C are within the safety zone 106 of the vehicle. The safety zone 106 is a zone around the vehicle which triggers an automatic braking action upon detection of an object and/or pedestrian. This feature is referred to as a collision avoidance system. In some embodiments, the size of the safety zone 106 is dependent on the speed of the vehicle 102. A default size for safety zone 106 may be used when vehicle 102 is stationary. The autonomous safety systems of the vehicle prevent the vehicle from moving, leaving the vehicle 102 vulnerable for person 108B to rob the occupants of the vehicle.

Figure 2A:
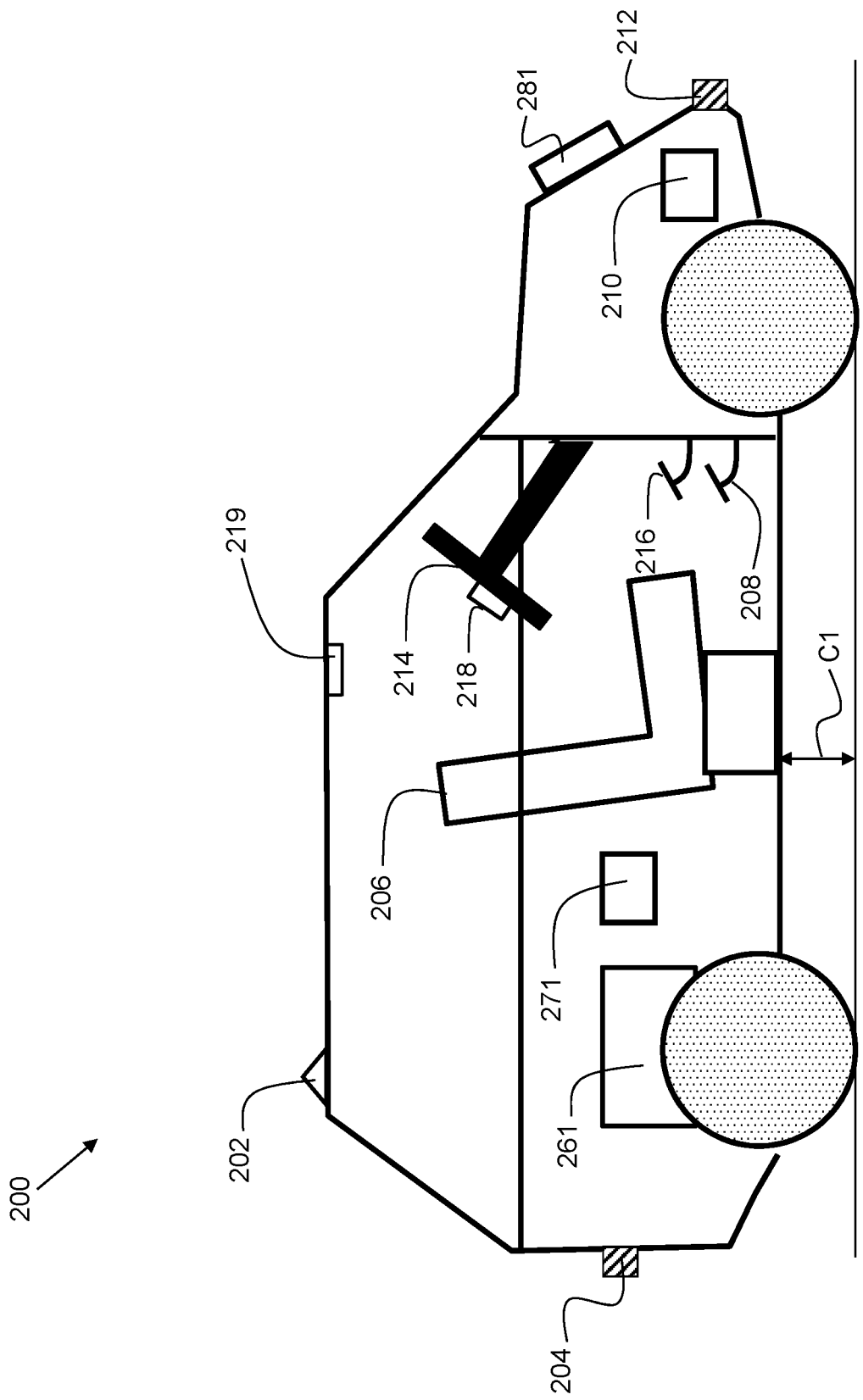
FIG. 2A shows a vehicle with autonomous features in accordance with embodiments of the present invention.

FIG. 2A shows a vehicle 200 with autonomous features in accordance with embodiments of the present invention. Vehicle 200 includes drive train 261 that may include a combustion engine and/or electric motor(s). Vehicle 200 may include a rear facing sensor system 204, and a front facing sensor system 212. The rear facing sensor system 204 and front facing sensor system 212 may include, but are not limited to, a camera, an infrared camera, lidar, radar, range determining equipment, and the like. The inputs from the rear facing sensor system 204 and front facing sensor system 212 are input to computer 210. In embodiments, the rear facing sensor system 204 and front facing sensor system 212 may be coupled to the computer 210 via a CAN bus, Ethernet network, serial connection such as RS-232, RS-485 or the like, and/or a wireless connection scheme.

Vehicle 200 is equipped with an accelerator pedal 208 and a brake pedal 216. Vehicle 200 is further equipped with antenna 202 which may be used for radio communication including AM, FM, and satellite radio reception, as well as cellular telephony and/or vehicle-to-vehicle (V2V) communication and/or vehicle-to-infrastructure (V2I) communication.

Vehicle seat 206 is configured and disposed to secure an occupant as a driver such that the occupant can operate pedals 208 and 216 with his feet. Additionally, steering wheel 214 allows control of the direction of the vehicle via the front, back, or all wheels of the vehicle. Emergency button 218 invokes an autonomous feature override for theft prevention. If a user encounters a scenario such as depicted in FIG. 1, the user can press button 218 to override the collision prevention features. Without such a capability, a user in a vehicle such as 102 of FIG. 1 is trapped just by the presence of the pedestrians 108A and 108C, as the safety systems of the vehicle prevent movement with a pedestrian blocking the escape paths of the vehicle. Under normal circumstances, it is highly desirable to prevent a vehicle from striking a pedestrian or other object, but hard coding this feature leaves vehicles with autonomous features vulnerable to theft and/or carjacking by the strategy outlined in FIG. 1. With embodiments of the present invention, in such an emergency, the user can invoke an emergency escape mode by pressing emergency escape button 218. Invoking emergency escape mode may include deactivating a collision avoidance system. While emergency escape button 218 is shown on the steering wheel 214, in practice, the emergency escape button 218 may be placed on the dashboard, vehicle floor, center console, or other location. In some embodiments, multiple presses of the button may be required to invoke the emergency escape mode to prevent a single accidental button press from unintentionally triggering emergency escape mode. Placing the vehicle in emergency escape mode may disable one or more safety systems, including an airbag immobilization interlock.

Many modern vehicles automatically disable a vehicle if an airbag deploys. However, while in emergency escape mode, embodiments may allow a vehicle to perform an emergency maneuver and continue to operate even if one or more airbags within a vehicle deploy, allowing a user to safely flee a dangerous situation. Thus, embodiments include disabling an airbag immobilization interlock upon receiving an emergency activation signal.

In embodiments, in response to pressing the emergency escape button 218, the vehicle 200 may send a message via antenna 202 to an organization such as a local police department and/or a third-party monitoring service. Video from rear facing sensor system 204 and front facing sensor system 212 may be recorded by storage on computer 210 as evidence of the attempted theft/carjacking. In this way, under the circumstance of attempted theft, a user can override pedestrian collision prevention features. However, automatic notification of authorities and/or recording and distribution of video of the situation from the vehicle reduces the likelihood that the override is used for purposes other than a legitimate need to escape for the purposes of safety. In some embodiments, the video may be live streamed to a website for archiving and/or real time viewing. Thus, embodiments include streaming the video recording to a third party upon receiving the emergency activation signal.

The vehicle may further include an interior microphone 219. In embodiments, the interior microphone may be used for detecting a voice command used to assert the emergency activation signal. This can be an alternative technique for setting the vehicle to emergency escape mode. For example, the user may utter "Danger—need to escape now" to start the sequence to put the vehicle in emergency escape mode. In some embodiments, the system may respond with a confirmation statement such as "Confirm, enter emergency mode, yes or no?" In some embodiments, the emergency escape mode voice command (e.g. "Danger—need to escape now") may be on a placard or signage visible in the vehicle, such that occupants know the command. Preferably, the command is a phrase that is unlikely to naturally occur in conversation. In some embodiments, the voice command may include an alphanumeric confirmation code. As an example, the confirmation code, as printed on a placard in the vehicle may read "For emergency escape, utter the phrase 'Danger—code 4715X.'" Since that exact phrase is unlikely to occur in natural conversation, in those embodiments, the confirmation step may be skipped, allowing the escape to commence earlier than if a confirmation statement is required. This can potentially save the lives of the vehicle occupants in a dangerous situation where immediate escape is required. Thus, in embodiments, the escape mode is entered upon detection of a voice command that includes a unique alphanumeric confirmation code.

In embodiments, the vehicle includes an adjustable-height suspension system 271. The adjustable-height suspension system 271 is operable to increase the ground clearance from a height C1 to a height C2 (in FIG. 2B), where C2>C1.

The vehicle may further include a directional sound cannon 281. The sound cannon 281 may comprise an audio system arranged to produce a sound wave that may be directed to a selected location. When the vehicle is in escape mode, the directional sound cannon 281 may be activated to warn and encourage pedestrians to move away from the exit path of the vehicle. Such sound cannons may utilize aspects described in U.S. Pat. No. 6,359,835, which is incorporated herein by reference in its entirety.

Figure 2B:
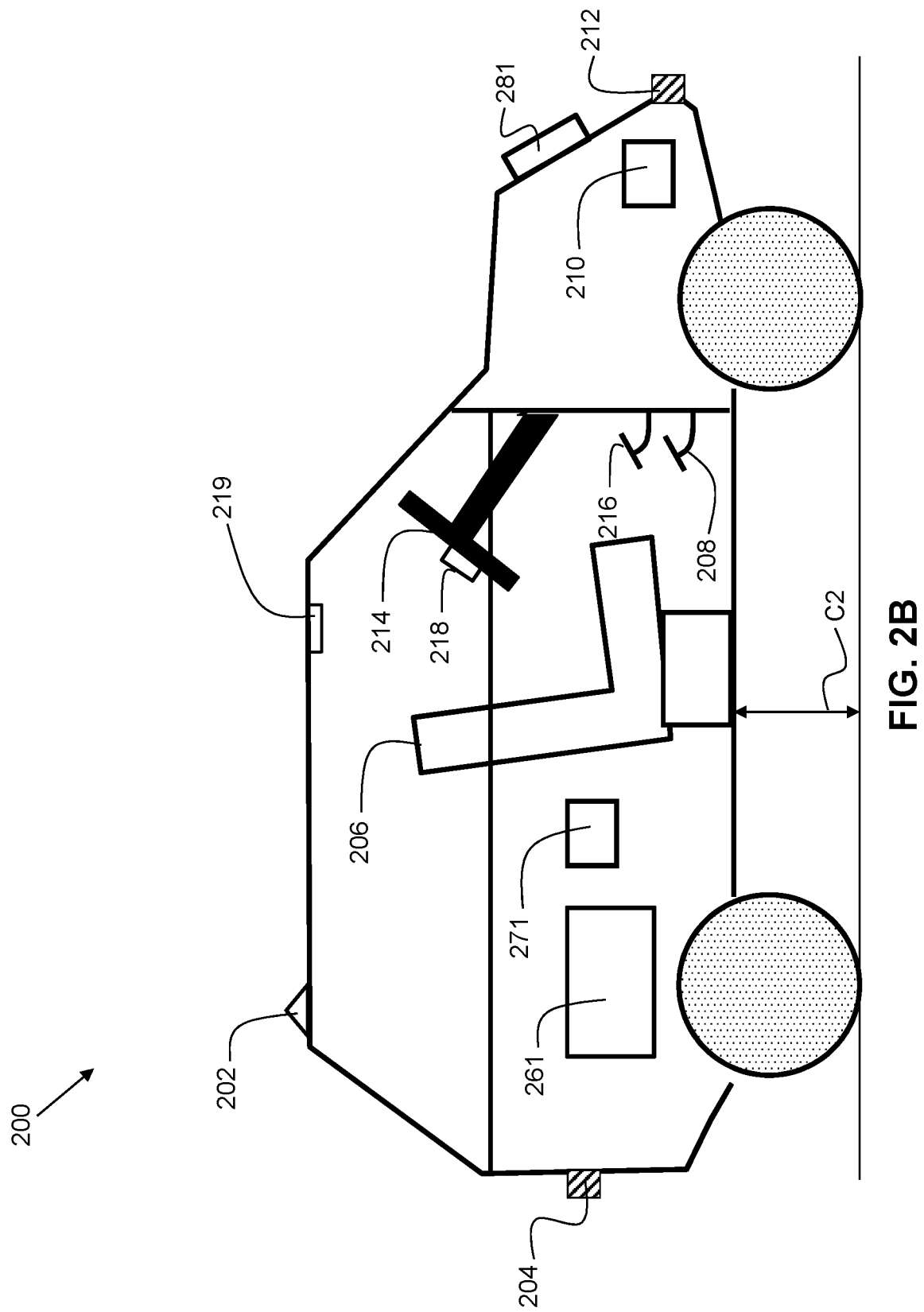
FIG. 2B shows a vehicle with autonomous features in accordance with embodiments of the present invention in an elevated configuration.

FIG. 2B shows an example of a vehicle in an elevated configuration. In embodiments, the elevated configuration maybe achieved by configuring an adjustable-height suspension system 271 of a vehicle, inflation of tires, and/or other suitable techniques. In embodiments, putting the vehicle in an elevated configuration changes the ground clearance of the vehicle from C1 in FIG. 2A to C2 in FIG. 2B. In embodiments, C1 may range from 15 centimeters to 20 centimeters, and C2 may range from 23 centimeters to 33 centimeters. The increased ground clearance may aid the vehicle in escape by allowing it to go over obstacles such as sidewalk curbs or other items in the escape path. Adjustable-height suspension system 271 may utilize aspects described in U.S. Pat. No. 9,662,955B2, which is incorporated herein by reference in its entirety.

Figure 3:
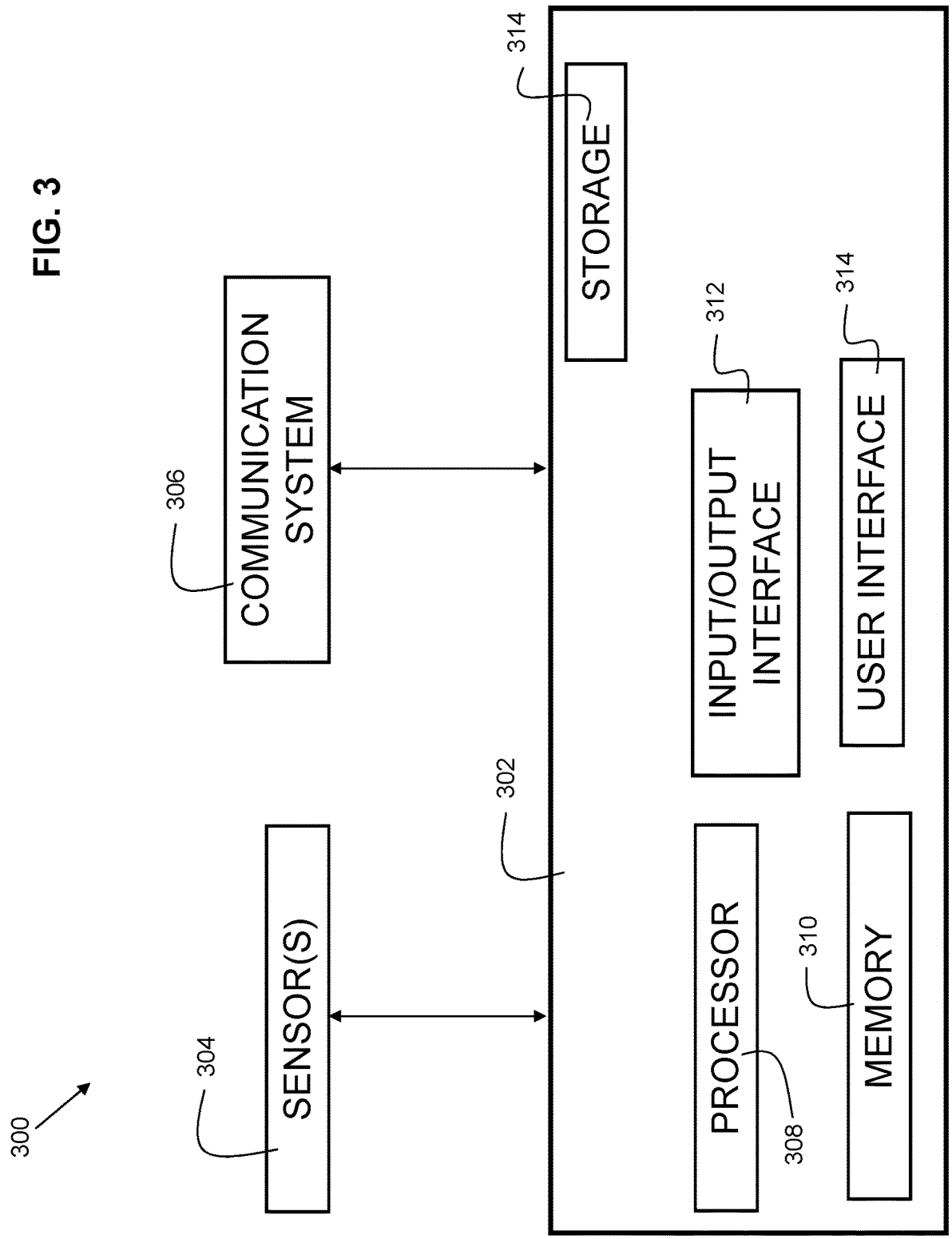
FIG. 3 is a block diagram of a system in accordance with embodiments of the present invention.

FIG. 3 is a block diagram of a system in accordance with embodiments of the present invention. System 300 includes a computer 302, which may be similar to computer 210 shown in FIG. 2. The computer 302 includes a processor 308, and memory 310 coupled to the processor 308. In embodiments, the memory 310 is non-transitory, and may include ROM, static RAM, flash, or the like. The memory 310 contains instructions, that when executed by processor 308, perform steps in accordance with embodiments of the present invention. The computer 302 may further include an input/output (I/O) interface 312, and a user interface 314. In embodiments, the user interface 314 may include the emergency escape button. The I/O interface 312 may interface with one or more sensors 304 from the rear facing sensor system 204, and front facing sensor system 212. The computer 302 may further interface with a communication system 306 for transmitting a message indicating that an emergency escape has been triggered. Storage 314 may include magnetic storage such as a hard disk drive, and/or a solid-state disk drive (SSD), or other suitable memory for storing video. In embodiments, once the emergency escape is triggered, video and/or other sensor data is stored to storage 314 for later examination during investigation of the incident.

Figure 4:
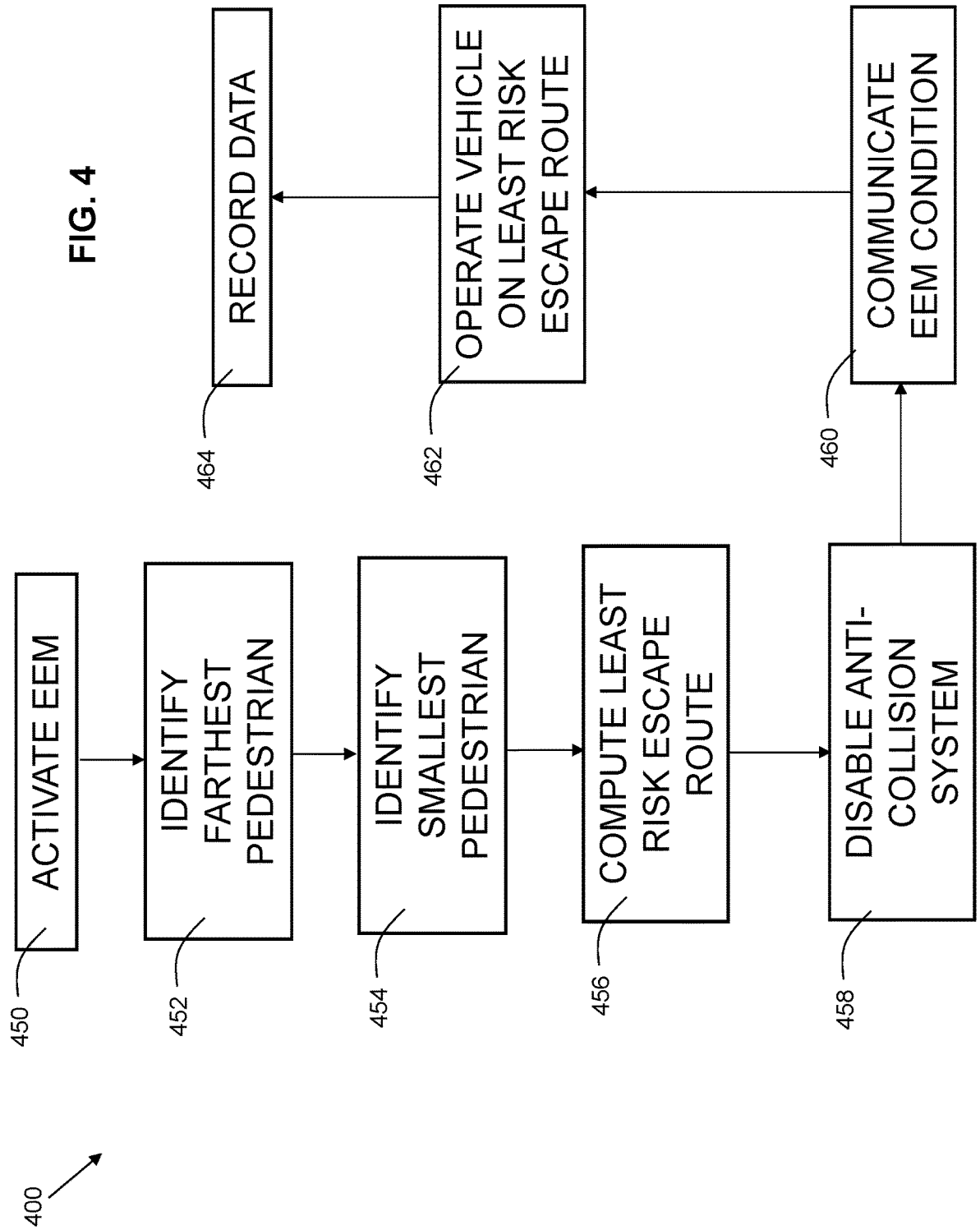
FIG. 4 is a flowchart indicating process steps for embodiments of the present invention.

FIG. 4 is a flowchart 400 indicating process steps for embodiments of the present invention. This embodiment may be used in a fully autonomous vehicle. At process step 450, an emergency escape mode is triggered by a user. The user may trigger the emergency escape mode by a button press, voice command, gesture, a combination of those, or other suitable mechanism. At process step 452, the farthest pedestrian within the safety zone is identified. At process step 454 a smallest pedestrian within the safety zone is identified. At process step 456, a least-risk escape route is computed. The least-risk escape route may include selecting a route that heads towards the person farthest away but still within the safety zone, which gives more time for that person to get out of the way of the vehicle. The least-risk escape route may include selecting a route that heads towards the smallest person within the safety zone, which results in less damage to the vehicle and increases the probability of a successful escape. At process step 458, the anti-collision system is disabled, allowing the vehicle to escape the dangerous situation. At process step 460, the emergency escape mode condition is communicated. In embodiments, the emergency escape mode may be communicated by an automated text and/or voice call to 911 or other police agency. Thus, embodiments can include sending an emergency escape warning message upon receiving an emergency activation signal. At process step 462, the vehicle is operated on the route determined at 456. At process step 464, the data (e.g. camera data and other sensor data) from the vehicle is recorded. Thus, embodiments include initiating a video recording upon receiving the emergency activation signal. In some embodiments, the vehicle may issue a warning to the surrounding pedestrians upon activation of emergency escape mode.

The warning may be in the form of blinking the headlights and taillights of the vehicle and/or honking the horn. In some embodiments, the vehicle may be equipped with a directional sound cannon (DSC). The directional sound cannon is a device capable of producing a loud sound in a specific direction. The directional sound cannon is non-lethal, but capable of producing a painful sound for people in the path of the directed sound. In embodiments, the warning may include activation of a directional sound cannon. One such sound cannon is the LRAD 500X, produced by GENASYS Company of San Diego, Calif. Thus, embodiments include activating an external audible alert upon receiving the emergency activation signal. Embodiments may include activating an external visual alert upon receiving the emergency activation signal. Note that while the flowchart 400 shows steps in a sequential manner, in embodiments, one or more of these steps may be performed simultaneously, or performed in a different order. For example, process steps 452 and 454 may be performed simultaneously. Process step 464 can be performed before process step 452, and so on.

Figure 5:
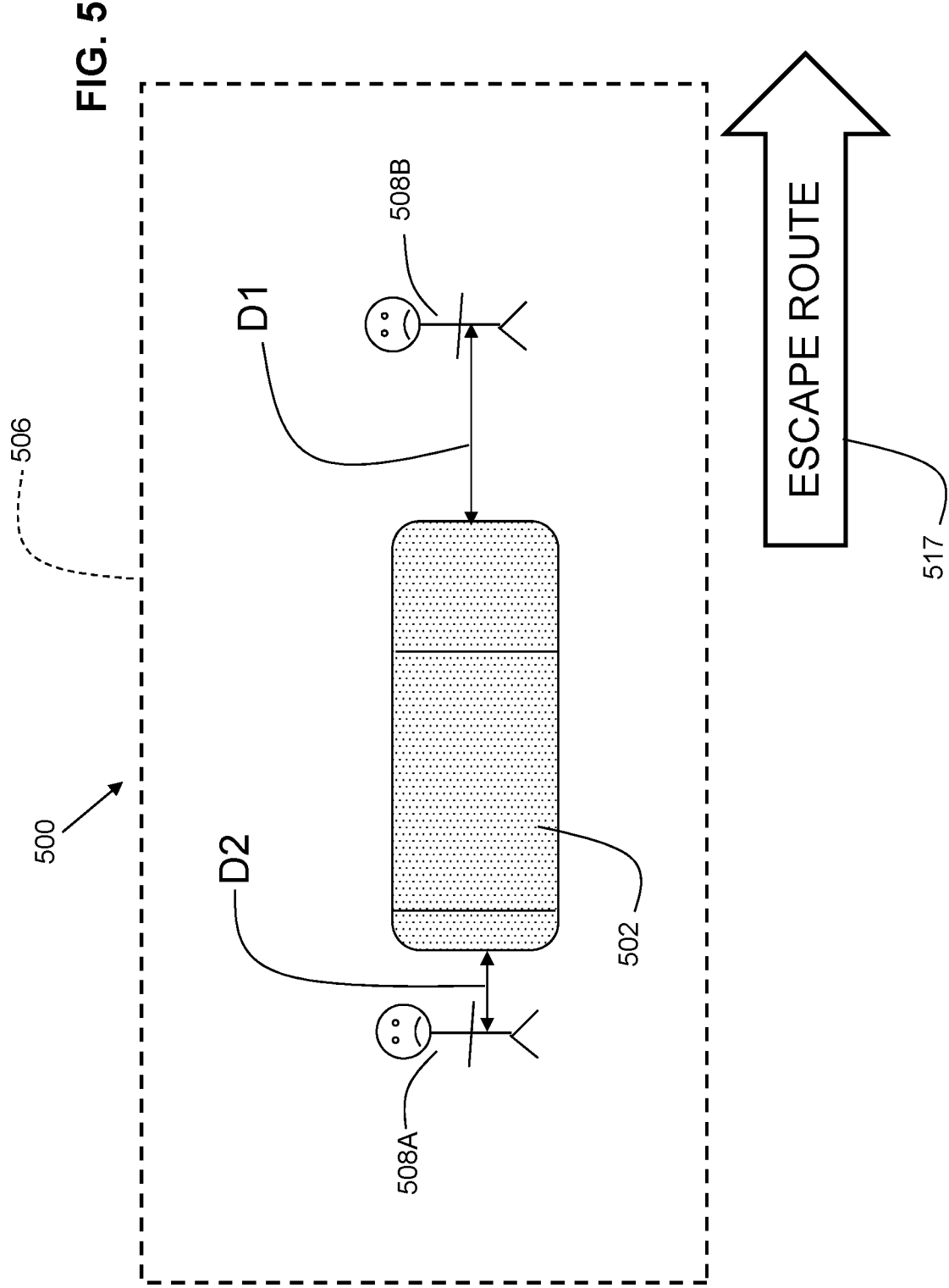
FIG. 5 illustrates an exemplary emergency escape mode based on pedestrian distance.

FIG. 5 illustrates an exemplary emergency escape mode based on pedestrian distance. In the example 500, pedestrian 508A is at a distance D2 from vehicle 502 and pedestrian 508B is at distance D1 from vehicle 502, where D1>D2. Both pedestrians are standing within vehicle safety zone 506. In embodiments, the escape route is selected based on the direction having the farthest pedestrian distance. In this case, pedestrian 508B is farther away from vehicle 502 than pedestrian 508A, thus the escape route is selected as the direction indicated by arrow 517. Thus, embodiments include determining a path of least resistance by computing an impact target body distance estimate, and selecting a path that travels in a direction of a greatest minimum target body distance. The impact target body distance estimate is the estimated distance between the vehicle 502 and a pedestrian that would be struck on a given escape route. The greatest minimum target body distance is the greatest minimum distance from the vehicle amongst the pedestrians within the safety zone on a given escape route. Thus, in the example 500, the greatest minimum distance is D1.

Figure 6:
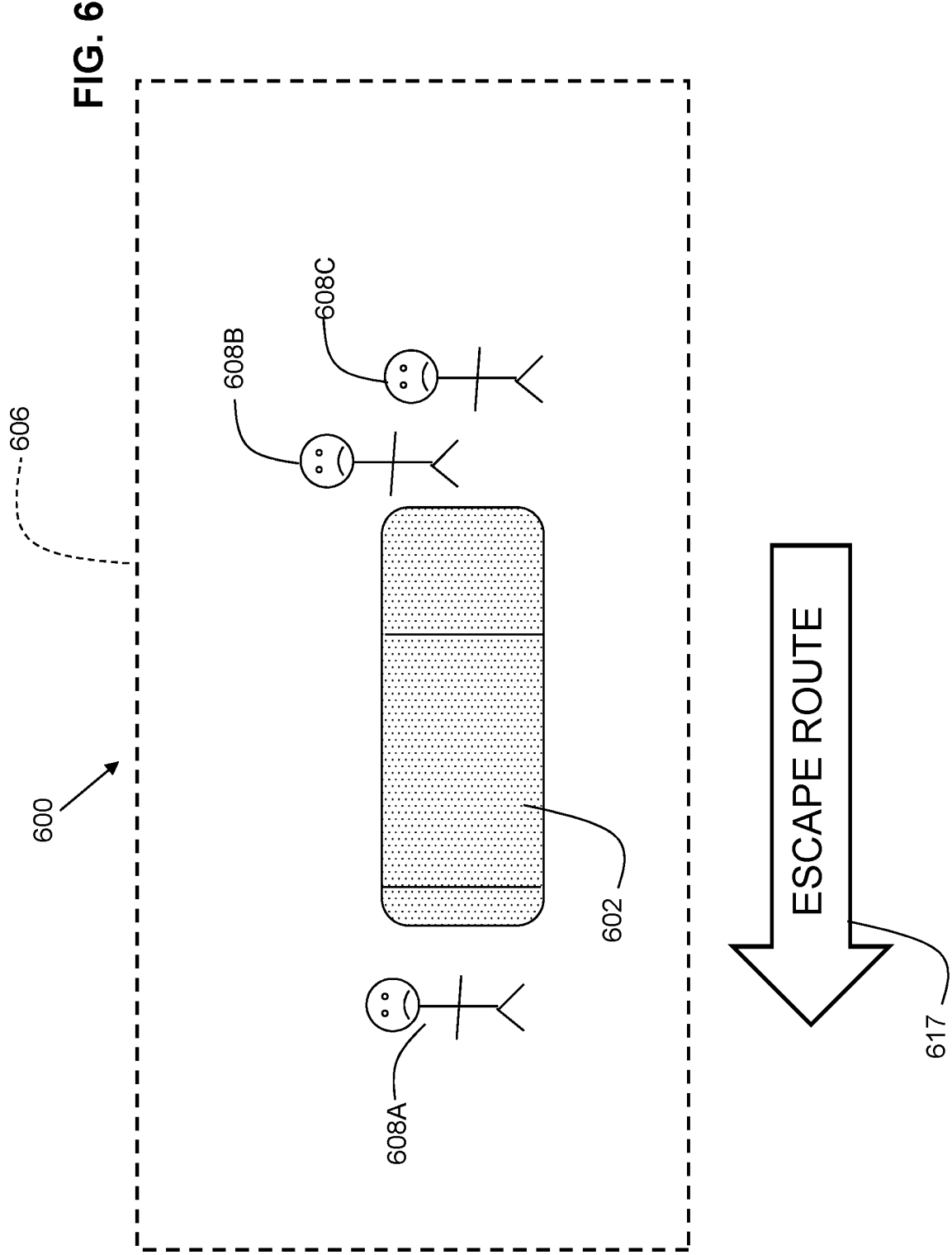
FIG. 6 illustrates an exemplary emergency escape mode based on pedestrian number.

FIG. 6 illustrates an exemplary emergency escape mode based on pedestrian number. In the example 600, there is one pedestrian 608A at the rear of the car, and two pedestrians 608B and 608C at the front of the car. All three pedestrians are standing within vehicle safety zone 606. In general, the variable B represents the number of pedestrians at the rear of the car, and the variable F represents the number of pedestrians at the front of the car. Thus, in embodiments, the following algorithm may be used:

```
if (B > F)
    escape_route(reverse)
else
    escape_route(forward)
```

In the example 600, B>F, and so the escape route of vehicle 602 is selected as the direction indicated by arrow 617.

Figure 7:
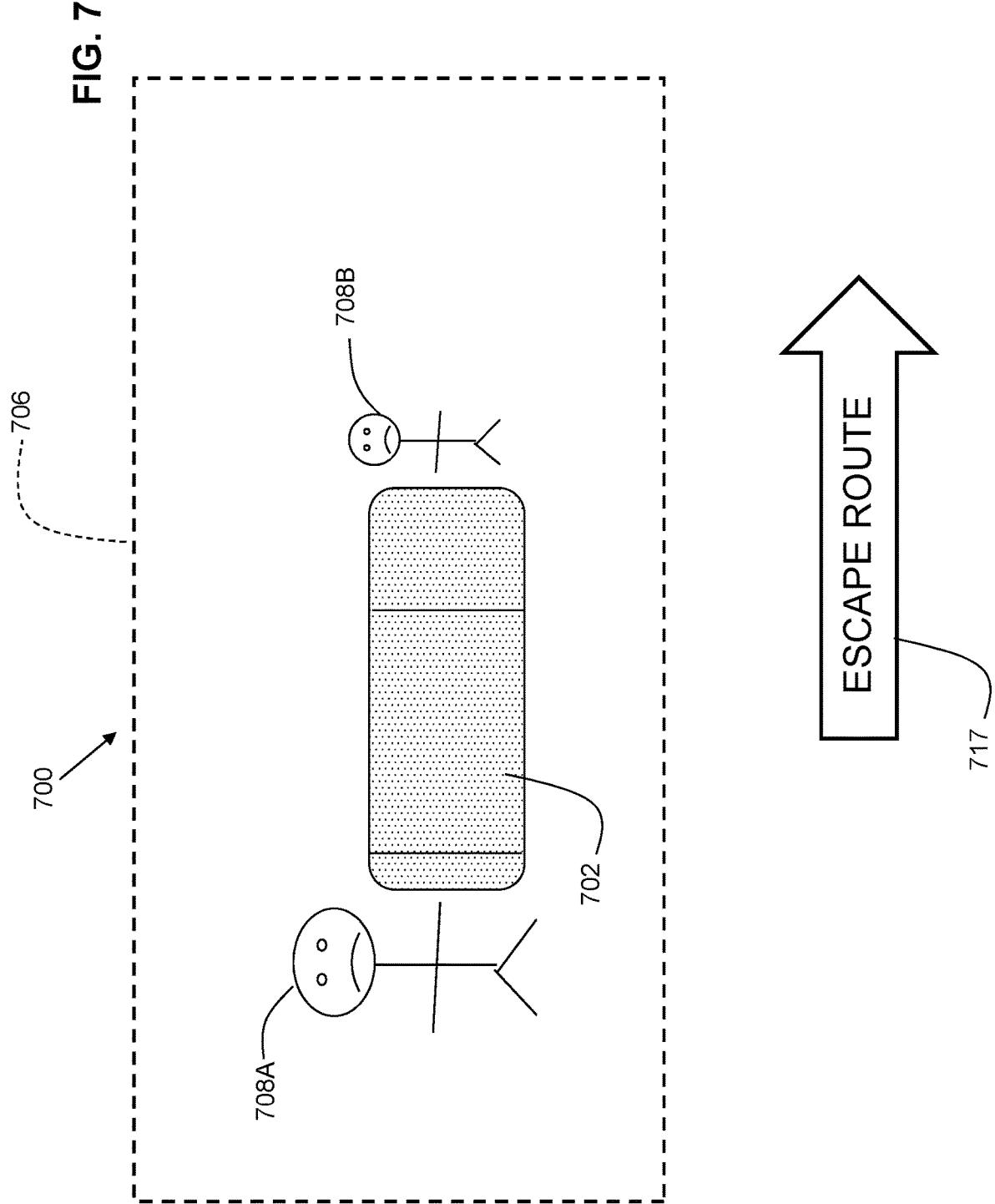
FIG. 7 illustrates an exemplary emergency escape mode based on pedestrian size.

FIG. 7 illustrates an exemplary emergency escape mode based on pedestrian size. Both pedestrians are standing within vehicle safety zone 706. In the example 700, the pedestrian 708A is considerably larger than pedestrian 708B, and hence, the escape route is selected as the direction indicated by arrow 717. In this way, the escape route of vehicle 702 is directed towards the smaller pedestrian, reducing the risk of vehicle damage and thus increasing the probability of a successful escape.

Figure 8:
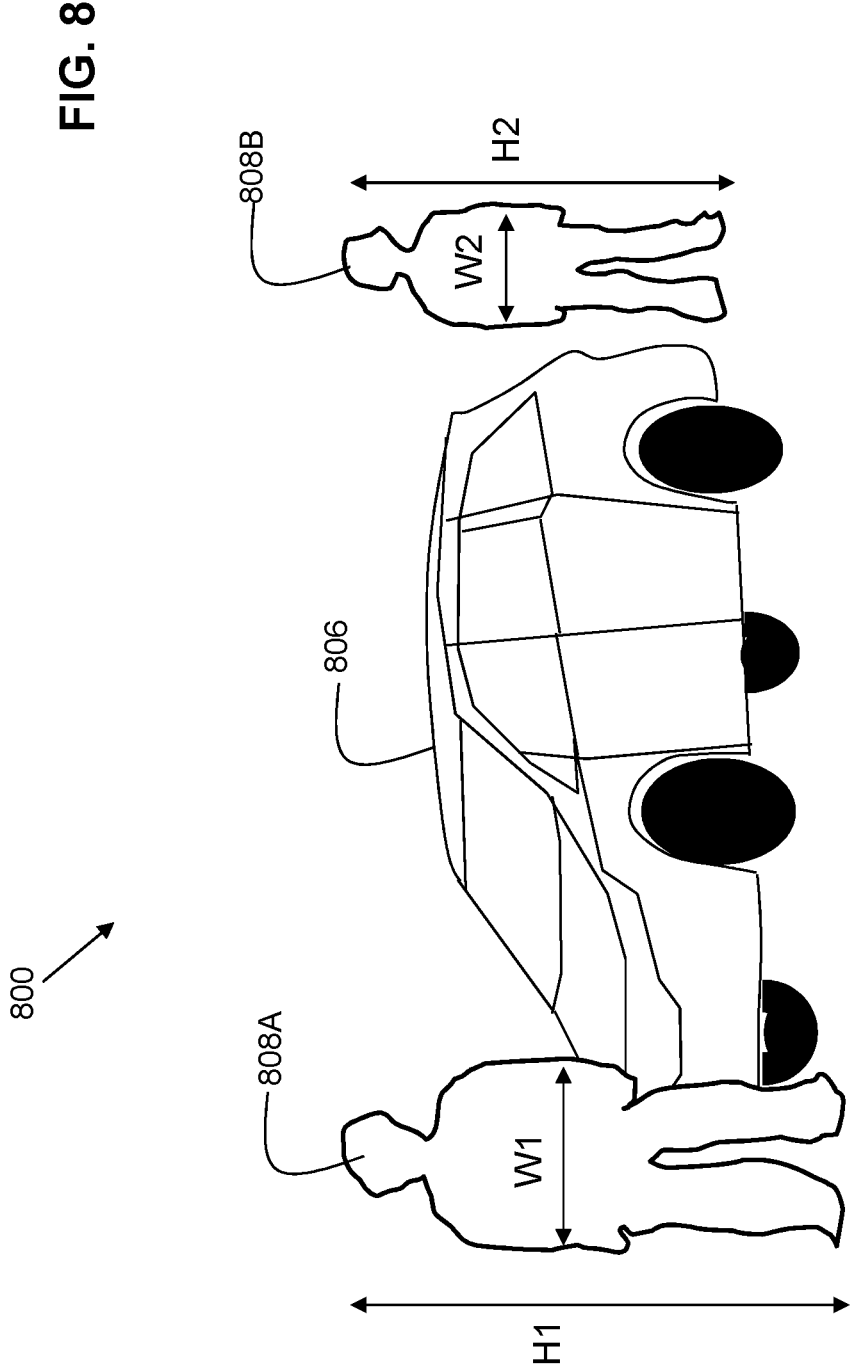
FIG. 8 illustrates an exemplary emergency escape mode based on pedestrian height and width.

FIG. 8 illustrates an exemplary emergency escape mode based on pedestrian height and width. In the example 800, pedestrian 808A is standing in front of vehicle 802 and pedestrian 808B is standing behind vehicle 802. Pedestrian 808A has a detected height H1 and a detected width W1. Pedestrian 808B has a detected height H2 and a detected width W2. In embodiments, the height and width of each pedestrian detected by vehicle 802 is approximated by the rear facing sensor system 204, and front facing sensor system 212. In embodiments, the units may be centimeters, inches, or other units. In embodiments, the height and width of each pedestrian is multiplied together to derive a size score, which is representative of a target body mass. For example, if W1 is 41 inches and H1 is 74 inches, then the size score for pedestrian 808A is 3034. Furthermore, if W2 is 36 inches and H2 is 76 inches, then the size score for pedestrian 808B is 2736. Thus, the preferred escape route is in the direction of pedestrian 808B because that pedestrian has a smaller size score than pedestrian 808A, even though pedestrian 808B is detected as being taller than pedestrian 808A. Thus, embodiments include determining a path of least resistance by computing an impact target body mass estimate, and selecting a path that travels in a direction of a minimal target body mass. The impact target body mass estimate is an estimate of the body mass of a pedestrian that would be struck during an escape on a given escape route. The minimal target body mass is the lowest mass of a pedestrian amongst the pedestrians that are within the safety zone 806.

The examples shown in FIGS. 5-8 illustrate various scenarios of computing a path of least resistance. The path of least resistance is a path deemed to cause the least bodily harm to pedestrians and/or maximize the probability of a successful escape. Embodiments may include a vehicle, comprising a drive train, a steering mechanism, an onboard computer configured to control the drive train, wherein the computer comprises, a processor, a memory coupled to the processor, wherein the memory contains instructions, that when executed by the processor, perform the steps of, receiving an emergency activation signal, determining a path of least resistance, deactivating a collision avoidance system, and directing the vehicle in the path of least resistance by controlling the drive train and the steering mechanism.

Figure 9:
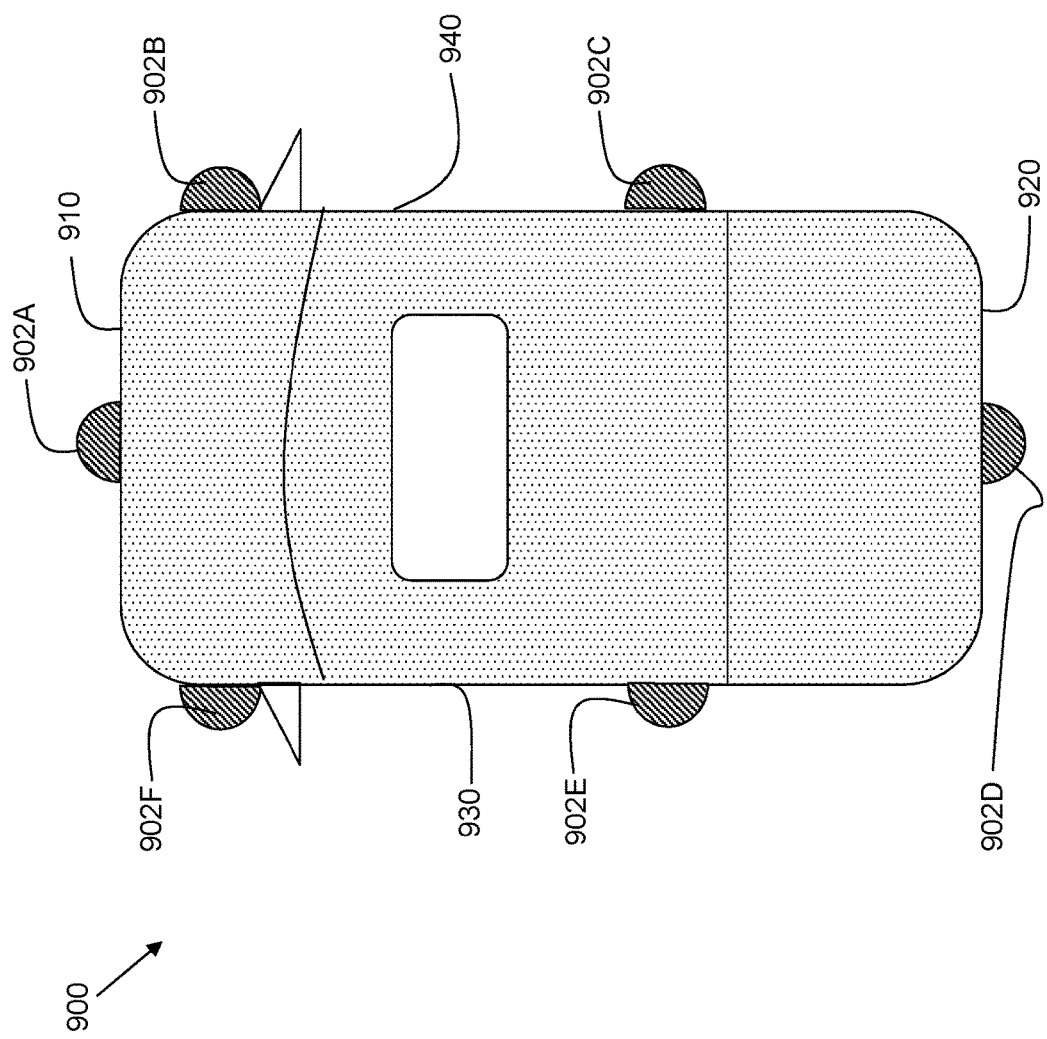
FIG. 9 illustrates a vehicle with multiple cameras mounted thereon.

FIG. 9 shows a top down view of a vehicle 900 with multiple vehicle cameras mounted thereon. Vehicle 900 has front portion 910, rear portion 920, first side portion 930, and second side portion 940. Camera 902A is mounted on vehicle 900 and configured and disposed to acquire images in the area of the front portion 910 of the vehicle. Camera 902E and camera 902F are mounted on vehicle 900 and configured and disposed to acquire images in the area of the first side portion 930 of the vehicle. Camera 902B and camera 902C are mounted on vehicle 900 and configured and disposed to acquire images in the area of the second side portion 940 of the vehicle. In embodiments, a processor, such as 308 of FIG. 3, executes instructions stored in a non-transitory computer-readable medium in order to stich images captured by cameras 902A-902F to create a synthesized vehicle view. In such systems, a synthesized image of a user's vehicle is displayed on an electronic display within that vehicle, along with the vehicle surroundings, as captured by the vehicle-mounted cameras 902A-902F. A synthesized vehicle view system may utilize aspects described in US Patent Application Publication US2019/0143896 and/or US Patent Application Publication US2017/0372147, both of which are hereby incorporated herein by reference in their entireties.

Figure 10:
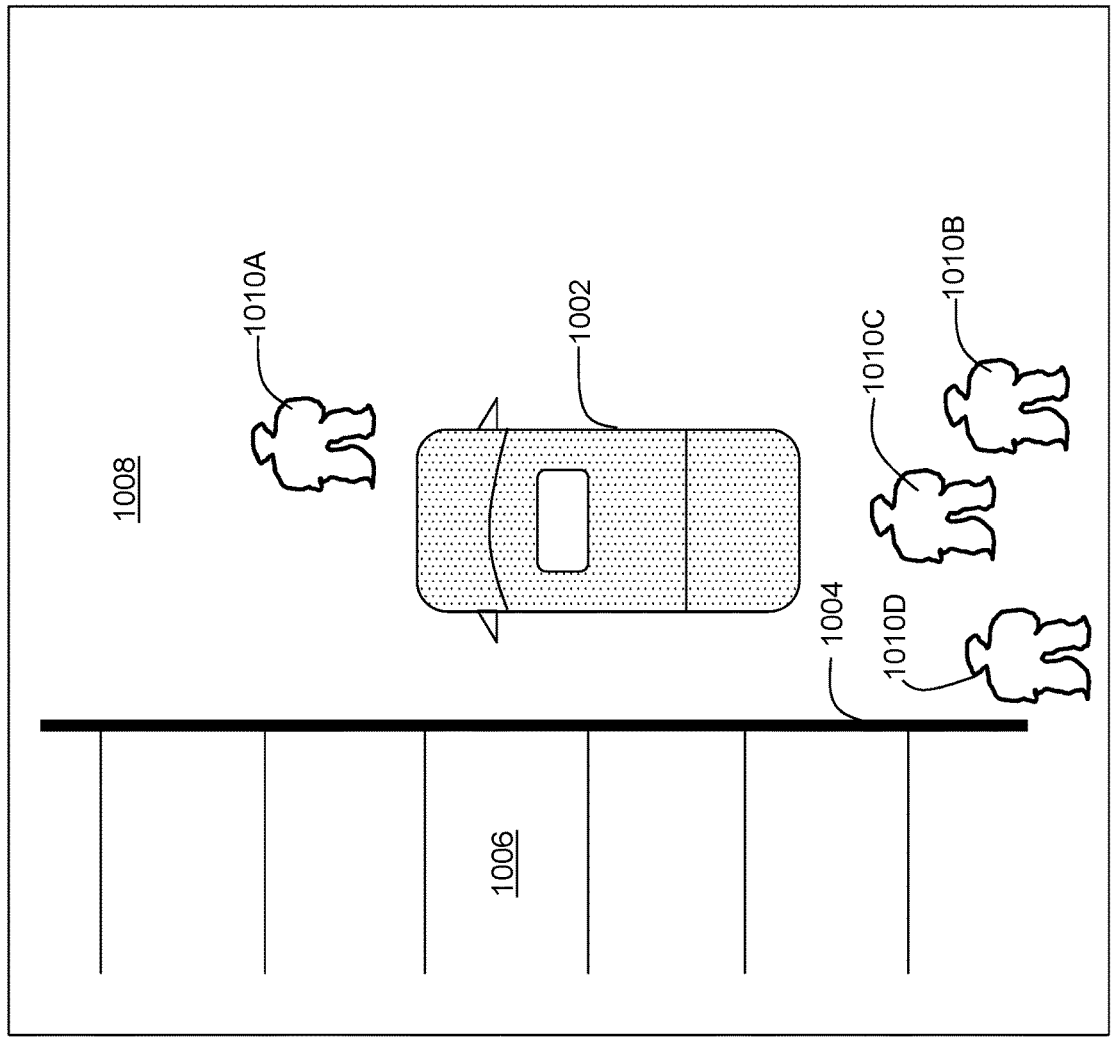
FIG. 10 shows an exemplary synthesized-view vehicle display from a vehicle with multiple cameras mounted thereon.

FIG. 10 shows a vehicle rendering on an electronic display 1000 of a synthesized-view vehicle display system. In embodiments, the electronic display 1000 may be a touch-sensitive display, such as a capacitive or resistive touch-sensitive display. In such embodiments, a user may be able to provide user input by touching the display 1000.

A computer-generated representation of the vehicle is indicated on the electronic display as 1002. In the example of FIG. 10, a first pedestrian 1010A is displayed in front of the vehicle representation 1002. Images of the first pedestrian 1010A may be acquired by front-facing camera 902A (FIG. 9). A second pedestrian 1010B, third pedestrian 1010C, and fourth pedestrian 1010D are displayed behind the vehicle representation 1002. A street curb 1004 and sidewalk 1006 are indicated to the left of the vehicle. The street curb 1004 separates the sidewalk 1006 from the street portion 1008. Generally, motorized vehicles are expected to operate in the street portion 1008, and not operate on the sidewalk 1006, which is typically reserved for pedestrian traffic.

Figure 11:
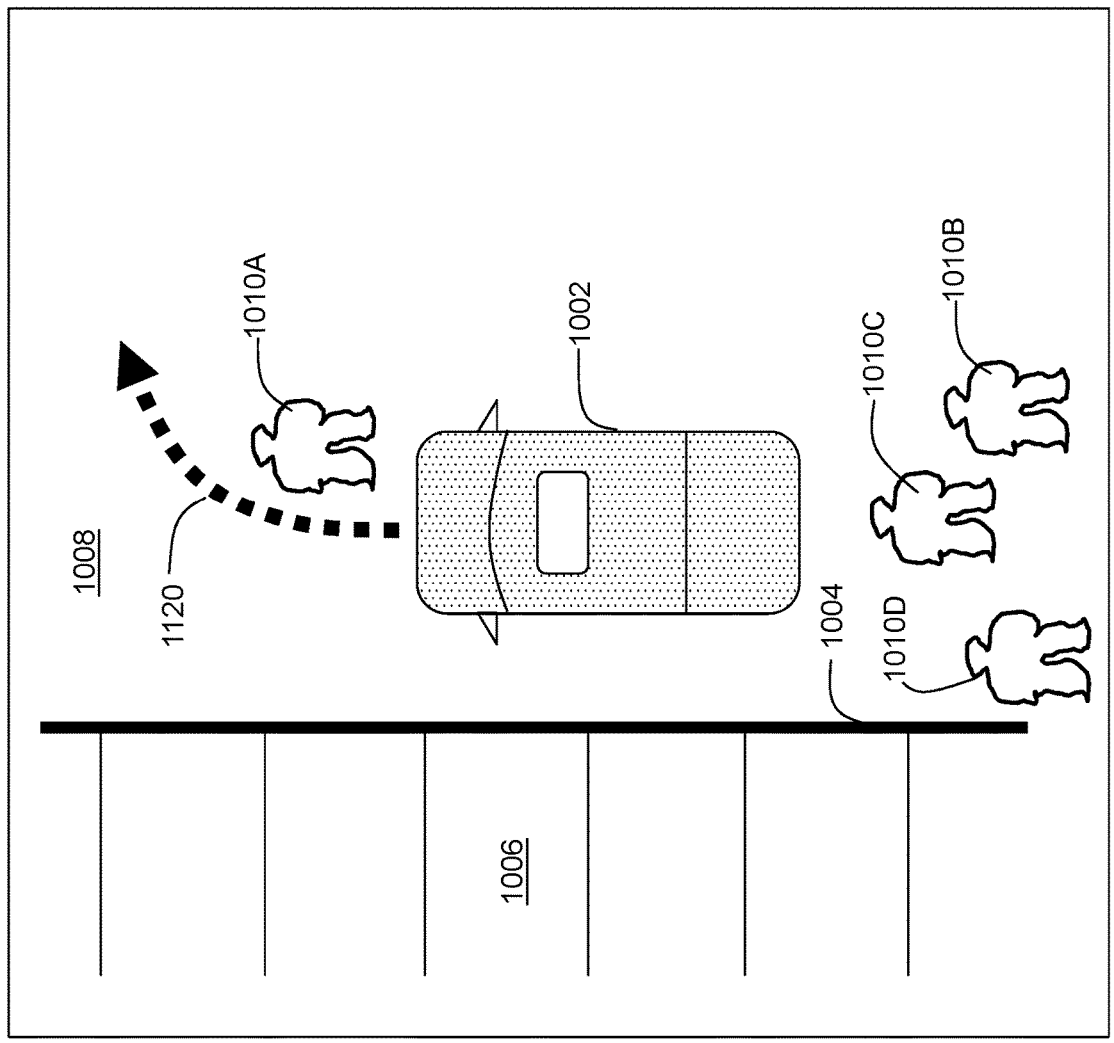
FIG. 11 shows an exemplary synthesized-view vehicle display indicating a user-preferred path for an escape route.

FIG. 11 shows a rendering of a user-preferred path on a synthesized-view vehicle display system in accordance with embodiments of the present invention. In embodiments, a user (e.g. occupant within the vehicle) may, upon recognizing a situation where immediate escape from the area is required, initiate a user-preferred path 1120 for escape by drawing it on the display 1000. In the example shown in FIG. 11, the first pedestrian 1010A is attempting to carjack the occupant of the vehicle represented by vehicle representation 1002. The user (occupant) may have determined that pedestrians 1010B, 1010C, and 1010D are not involved in the attempt, but just happen to be behind the vehicle at the time. The occupant of the vehicle can initiate a user-preferred path for escape that protects the innocent bystanders, and only threatens the perpetrator (pedestrian 1010A).

Embodiments include a vehicle configured to receive an emergency activation signal based on one or more indications from the emergency escape trigger; obtain a user-preferred path from a synthesized-view vehicle display system; deactivate a collision avoidance system; and direct the vehicle along the user-preferred path by controlling the drive train and the steering mechanism.

Embodiments can include a vehicle configured to receive an emergency activation signal based on one or more indications from the emergency escape trigger; determine a least resistance path; render the least resistance path on a synthesized-view vehicle display system; deactivate a collision avoidance system; and direct the vehicle along the user-preferred path by controlling the drive train and the steering mechanism.

Figure 12:
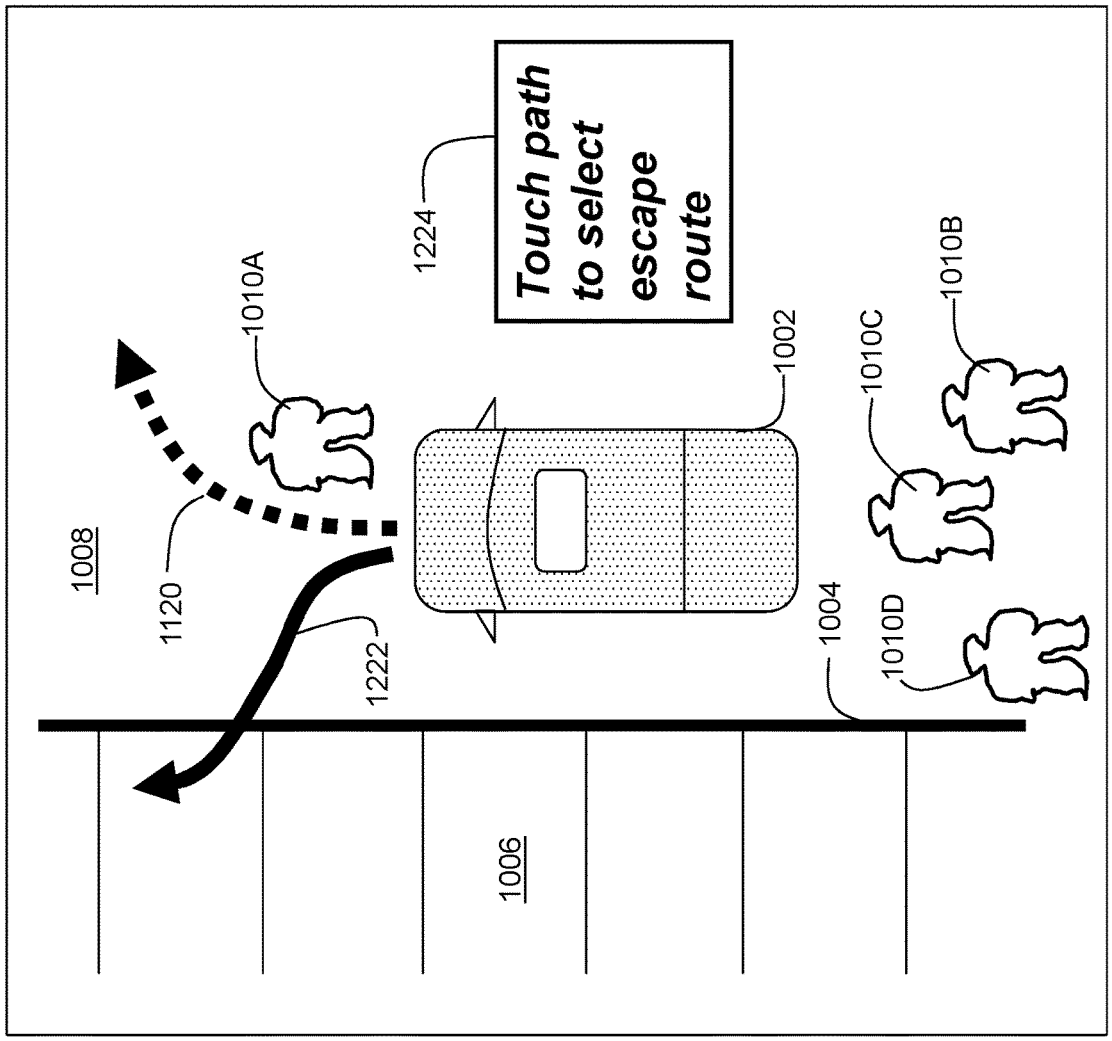
FIG. 12 shows an exemplary synthesized-view vehicle display indicating a user-preferred path for an escape route and a computer-generated least resistance path for an escape route.

FIG. 12 shows a rendering of a least resistance path and a user-preferred path on a synthesized-view vehicle display system in accordance with embodiments of the present invention. As shown in FIG. 11, in embodiments, a user may define a user-preferred path 1120 for escape. In embodiments, the processor (e.g. 308 of FIG. 3) may be based on evaluation of pedestrian locations, determine a least resistance path 1222 that differs from the user preferred path 1120. In this example, the least resistance path 1222 includes a portion of sidewalk 1006. While operation of motorized vehicles on sidewalks is normally prohibited/discouraged, the least resistance path 1222 directs the vehicle away from pedestrian 1010A. Since no pedestrians are currently on sidewalk 1006 in the trajectory of least resistance path 1222, the least resistance path 1222 may have an improved probability of successful escape, as compared to the user-preferred path 1120. In embodiments, the system may provide an instruction message 1224, on the display 1000, indicating to the user to select the path he/she wants to use by touching the path (1120 or 1222) rendered on the display 1000. In this way, a user can indicate the need to escape and select an appropriate path from the electronic display. In some embodiments, the vehicle may not have a user-operable steering control (e.g. steering wheel). An example of such a vehicle can include an autonomous shuttle bus that does not use an on-board operator. In such an embodiment, if an attempted carjacking or robbery of the occupants occurs, a user (occupant) of the vehicle can initiate an escape route. In embodiments, upon initiating the escape mode of the vehicle, messages and/or audio and/or video are sent to authorities (e.g. police) to indicate the activation of the escape mode. In embodiments, a sound cannon (e.g. 281, of FIG. 2A) is also activated upon entering escape mode, to further encourage pedestrians to move away from the path, to reduce the risk of injury as the vehicle escapes.

Embodiments can include a vehicle configured to determine a least resistance path; and receive a user selection between the user-preferred path and the least resistance path. Embodiments can include a vehicle configured to obtain a user-preferred path from the synthesized-view vehicle display system; and receive a user selection between the user-preferred path and the least resistance path.

Figure 13A:
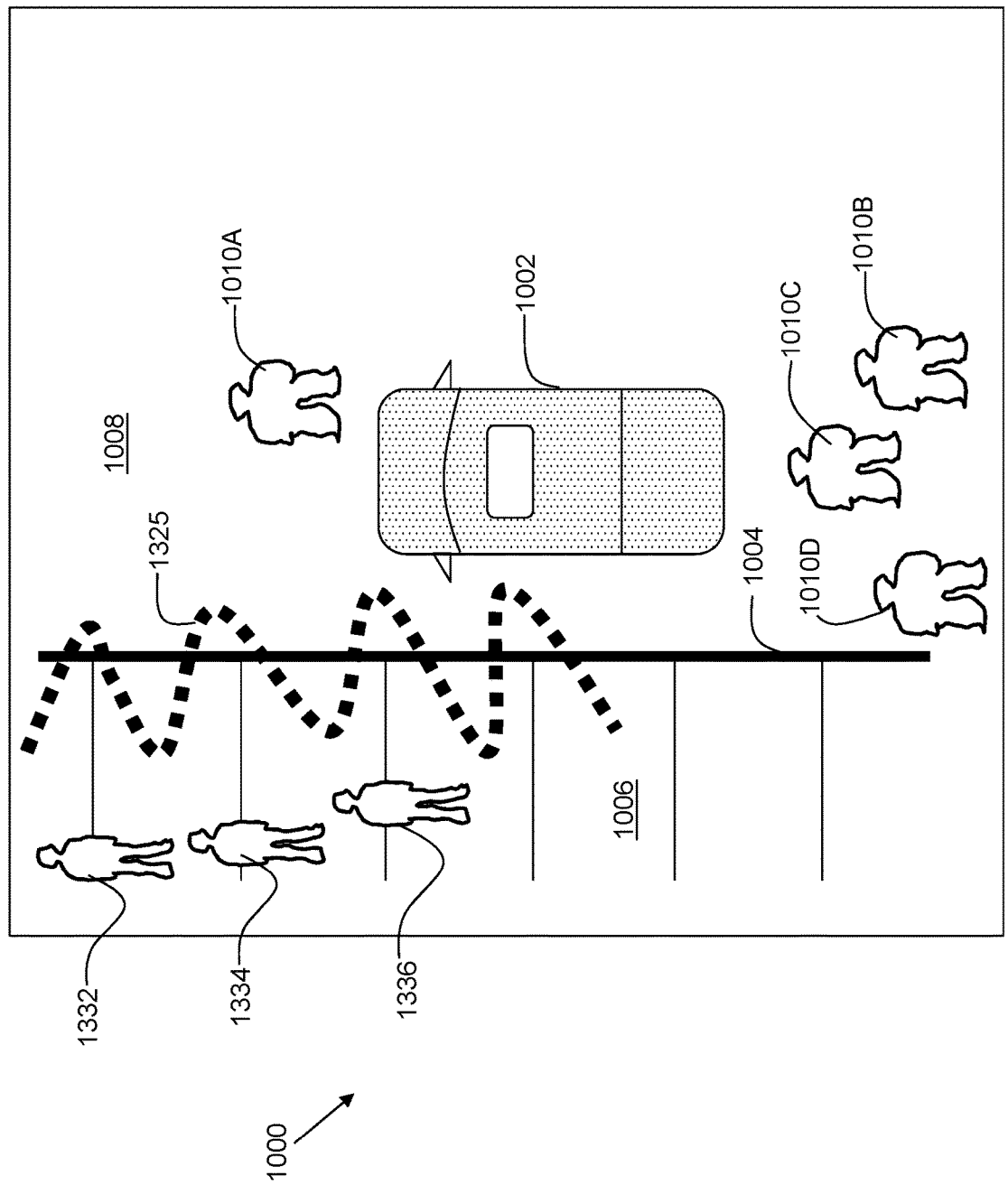
FIG. 13A and FIG. 13B show renderings of a user prohibition boundaries on a synthesized-view vehicle display system in accordance with embodiments of the present invention.
Figure 13B:
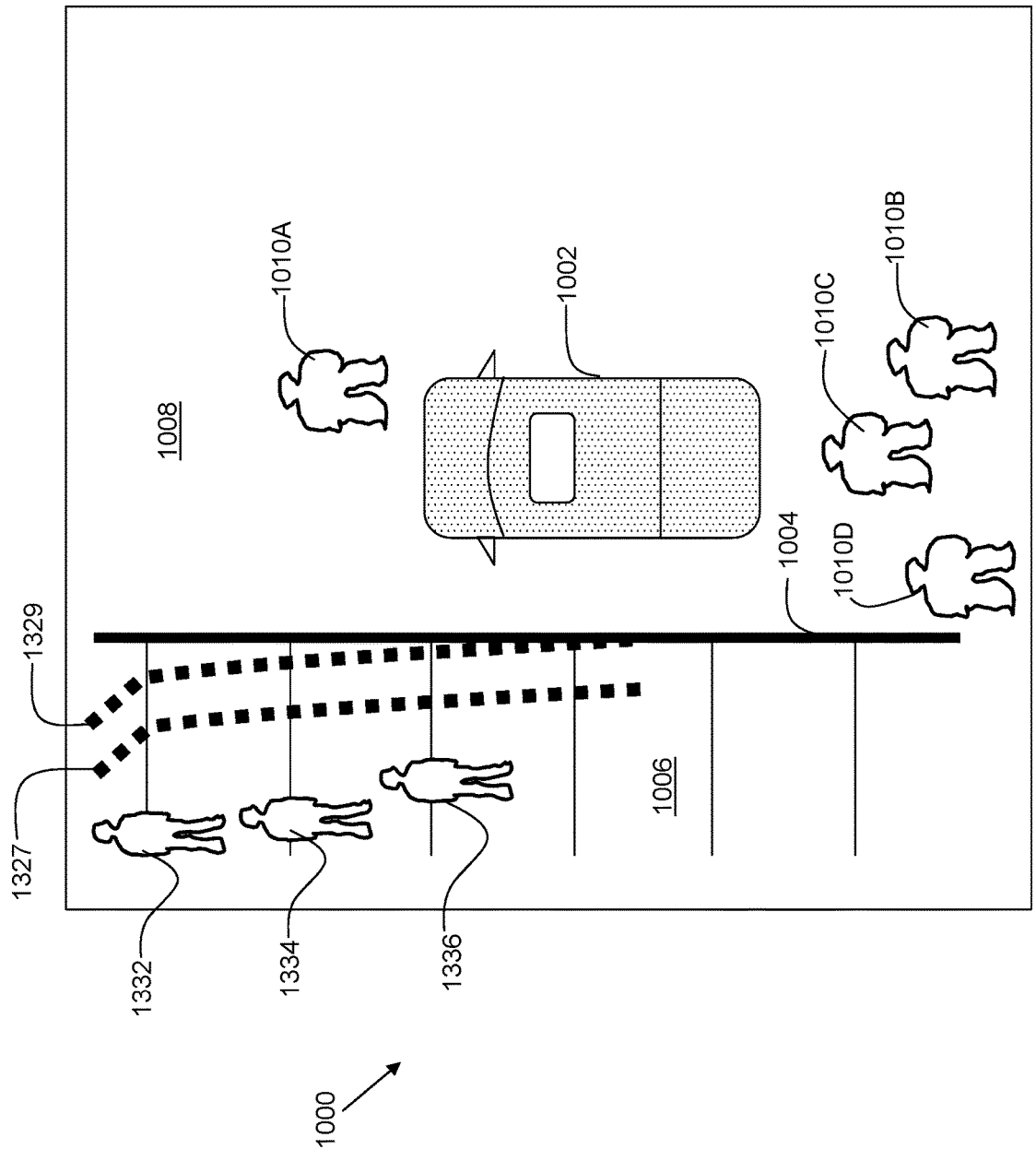

FIG. 13A shows a rendering of a user prohibition boundary 1325 on a synthesized-view vehicle display system in accordance with embodiments of the present invention. In the situation depicted in FIG. 13, there are multiple pedestrians on the sidewalk 1006, indicated as 1332, 1334, and 1336. In the scenario where pedestrians 1332, 1334, and 1336 are not participating in the attempted robbery or carjacking, the user (occupant) can use a user prohibition boundary to serve as an indication that the vehicle is prohibited from using an escape route that traverses the user prohibition boundary. In this way, the user can protect the pedestrians 1332, 1334, and 1336 while still initiating an emergency escape. In embodiments, the user prohibition boundary may be signified by using a rapid back-and-forth motion as the boundary is drawn, creating a "zig-zag" pattern. Referring now to FIG. 13B, an alternative embodiment is shown, in which a user prohibition boundary is formed by using two fingers close together, to form a first track 1327, and a second track 1329. Together, the two tracks signify a user prohibition boundary. This technique enables a user (occupant) to quickly signify a constraint for the escape planning. Other situations may also warrant such a constraint. As an example, a known hazard may exist, such as road construction, road damage, standing water, or other dangerous condition that autonomous systems on the vehicle may not be able to detect. With embodiments of the present invention, the user prohibition boundary prevents the autonomous systems from selecting an escape route that could possibly lead the vehicle towards the hazard. In essence, it is a way to instruct an autonomous or semi-autonomous vehicle to stay out of a particular area based on the user input from an electronic touch-sensitive screen.

Figure 14:
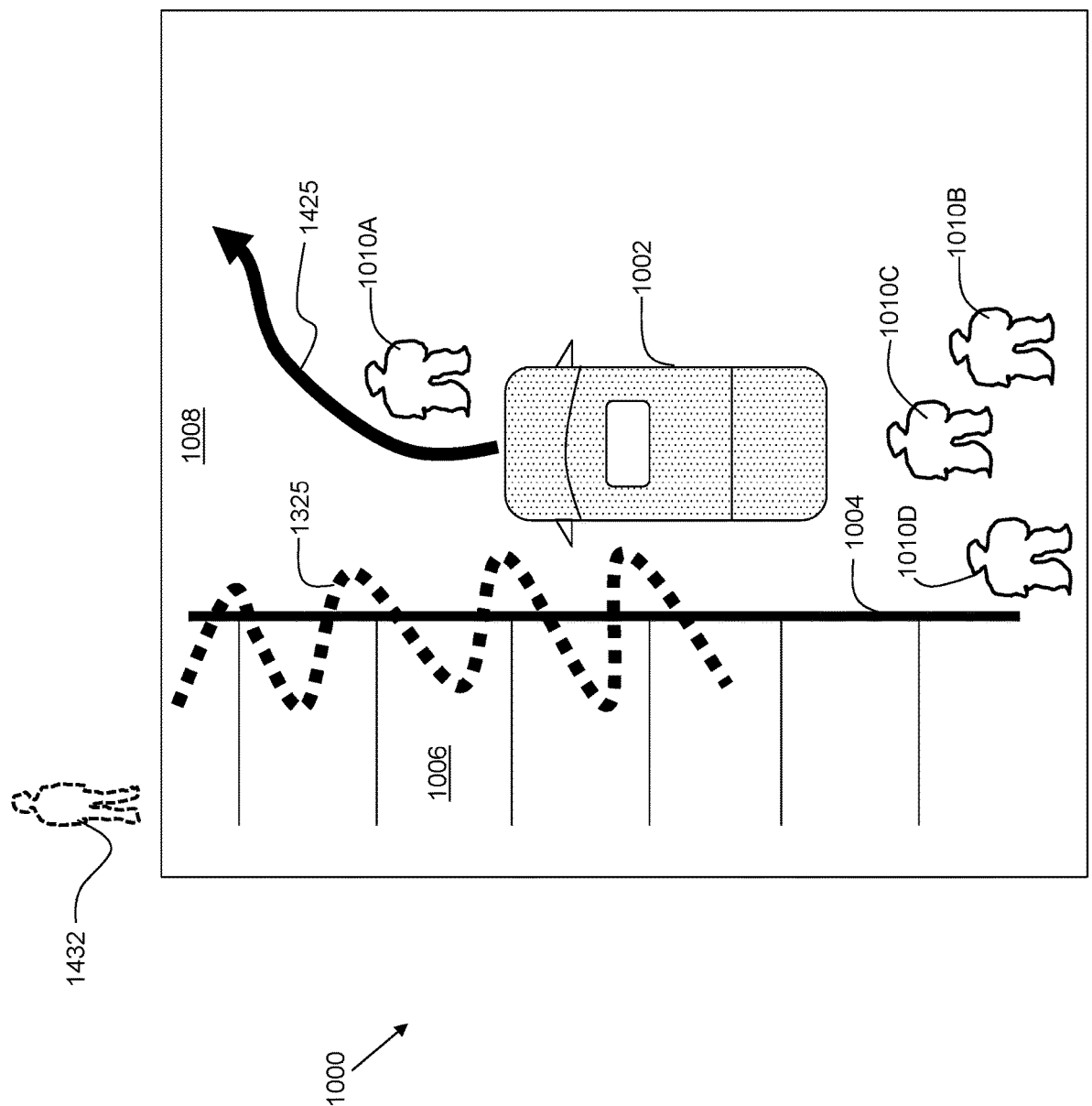
FIG. 14 shows a rendering of a least resistance path based on a user prohibition boundary on a synthesized-view vehicle display system in accordance with embodiments of the present invention.

FIG. 14 shows a rendering of a least resistance path based on a user prohibition boundary on a synthesized-view vehicle display system in accordance with embodiments of the present invention. In the situation depicted in FIG. 14, a user prohibition boundary 1325 has been indicated by a user (e.g. by drawing a zig-zag pattern on the electronic display 1000). This causes the processor (e.g. 308 of FIG. 3) to exclude the sidewalk region 1006 when computing a least resistance escape path. In this way, if there is an object, such as pedestrian 1432 that is outside the viewing area of the synthesized-view vehicle display system, the user (vehicle occupant) can guide the escape route away from the pedestrian 1432. In this example, the processor 308 then considers the region behind and in front of the vehicle, and, in accordance with embodiments of the present invention, computes path least resistance path 1425, heading away from the sidewalk 1006 as a result of the user prohibition boundary 1325.

Embodiments can include a vehicle configured to receive a user prohibition boundary from the synthesized-view vehicle display system; recompute the least resistance path based on the user prohibition boundary; and display the recomputed least resistance path on the synthesized-view vehicle display system.

Figure 15:
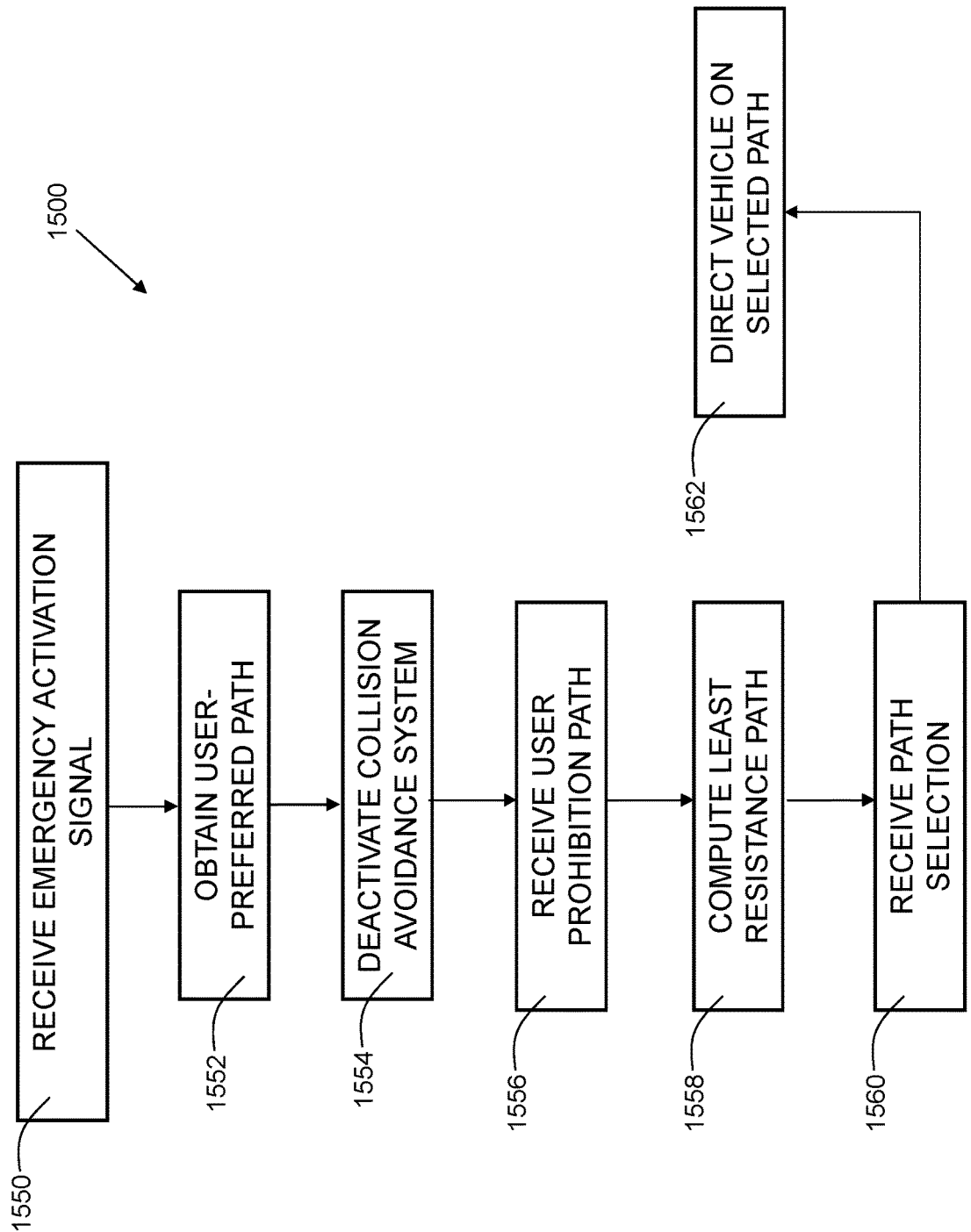
FIG. 15 is a flowchart for additional embodiments of the present invention.

FIG. 15 is a flowchart 1500 for additional embodiments of the present invention. At 1550, an emergency activation signal is received. In embodiments, the emergency activation signal may be initiated by pressing of an emergency button such as 218 of FIG. 2. In other embodiments, the emergency activation signal may be initiated via a voice command. At 1552, a user-preferred path is obtained. In embodiments, this may be obtained by receiving user input on an electronic touch-sensitive display, such as an infotainment or navigation screen of a vehicle. At 1554, the collision avoidance system is deactivated, to allow the vehicle to potentially maneuver over obstacles to escape. In some embodiments, airbags, and/or vehicle immobilization systems may also be deactivated as part of 1554. At 1556, optionally, a user prohibition path is received, examples of which, are indicated in FIG. 13A and FIG. 13B. At 1558, a least resistance path is computed, using techniques as indicated in FIG. 4. At 1560, a path selection is received, as indicated in FIG. 12, where the user touches a proposed path to select it as an escape route. At 1562, the vehicle is directed on the path selected at 1560. Note that some of the steps shown in FIG. 15 may be applied in different orders, or some steps may be omitted in certain embodiments.

As can now be appreciated, disclosed embodiments greatly improve occupant safety in vehicles with autonomous features by reducing the risk of being trapped by pedestrians as part of an attempted robbery and/or carjacking. While under normal circumstances, striking a pedestrian with a vehicle should be prevented at all costs, under the circumstance of bad actors intending malice to vehicle occupants, there needs to be an effective technique for initiating an escape.

The detailed description herein is presented largely in terms of processes and symbolic representations of operations performed by conventional computers. A computer may be any microprocessor or processor (hereinafter referred to as processor) controlled device, including terminal devices, such as personal computers, workstations, servers, clients, mini-computers, main-frame computers, laptop computers, a network of one or more computers, mobile computers, portable computers, or any combination thereof.

The computer may possess input devices such as, by way of example, a keyboard, a keypad, a mouse, a microphone, or a touch screen, and output devices such as a computer screen, display, printer, or a speaker. Additionally, the computer includes memory such as a memory storage device or an addressable storage medium.

The computer memory may advantageously contain program logic or other substrate configuration representing data and instructions, which cause the computer to operate in a specific and predefined manner as, described herein. The program logic may advantageously be implemented as one or more modules. The modules may advantageously be configured to reside on the computer memory and execute on the one or more processors. The modules include, but are not limited to software or hardware components that perform certain tasks. Thus, a module may include, by way of example, components, such as, software components, processes, functions, subroutines, procedures, attributes, class components, task components, object-oriented software components, segments of program code, drivers, firmware, micro-code, circuitry, data, and the like.

The program logic conventionally includes the manipulation of data bits by the processor and the maintenance of these bits within data structures resident in one or more of the memory storage devices. Such data structures impose a physical organization upon the collection of data bits stored within computer memory and represent specific electrical or magnetic elements. These symbolic representations are the techniques used by those skilled in the art to effectively convey teachings and discoveries to others skilled in the art.

The program logic is generally considered to be a sequence of computer-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be understood, however, that these and some other terms should be associated with appropriate physical quantities for computer operations and that these terms are merely conventional labels applied to physical quantities that exist within and during operation of the computer.

It should be understood that manipulations within the computer are often referred to in terms of adding, comparing, moving, searching, and the like, which are often associated with manual operations performed by a human operator. It is to be understood that no involvement of the human operator may be necessary, or even desirable. The operations described herein are machine operations performed in conjunction with the human operator or user that interacts with the computer or computers.

It should also be understood that the programs, modules, processes, methods, and the like, described herein are but an exemplary implementation and are not related, or limited, to any particular computer, apparatus, or computer language. Rather, various types of general-purpose computing machines or devices may be used with programs constructed in accordance with the teachings described herein. Similarly, it may prove advantageous to construct a specialized apparatus to perform the method steps described herein by way of dedicated computer systems with hard-wired logic or programs stored in non-volatile memory, such as read-only memory (ROM) or programs stored on machine-readable medium, such as a floppy disk, a CD, a DVD, or other recordable medium or memory device for storing the software. The machine-readable medium is operable by a computer or other device suitable to execute the software stored by the machine-readable medium.

Embodiments described above illustrate but do not limit the scope of this disclosure. It should also be understood that numerous modifications and variations are possible in accordance with the principles of the present disclosure. Accordingly, the scope of the disclosure is defined by the following claims.

What is claimed is:

1. A vehicle, comprising:
   a drive train;
   a steering mechanism;
   an onboard computer configured to control the drive train and steering mechanism,
   an emergency escape trigger coupled to the onboard computer;
   wherein the onboard computer comprises:
      a processor;
      a memory coupled to the processor;
      wherein the memory contains instructions, that when executed by the processor, cause the processor to:
         receive an emergency activation signal based on one or more indications from the emergency escape trigger;
         obtain a user-preferred path from a synthesized-view vehicle display system;
         deactivate a collision avoidance system; and
         direct the vehicle along the user-preferred path by controlling the drive train and the steering mechanism.

2. The vehicle of claim 1, wherein the memory further contains instructions, that when executed by the processor, cause the processor to:
   determine a least resistance path; and
   receive a user selection between the user-preferred path and the least resistance path.

3. The vehicle of claim 2, wherein the memory further contains instructions, that when executed by the processor, cause the processor to:
   receive a user prohibition boundary from the synthesized-view vehicle display system;
   recompute the least resistance path based on the user prohibition boundary; and
   display the recomputed least resistance path on the synthesized-view vehicle display system.

4. The vehicle of claim 1, wherein the steering mechanism includes a steering wheel, and wherein the emergency escape trigger comprises a button affixed to the steering wheel.

5. The vehicle of claim 1, further comprising a sound cannon, and wherein the memory further contains instructions, that when executed by the processor, cause the processor to activate the sound cannon in response to receiving the emergency activation signal.

6. The vehicle of claim 1, wherein the memory further contains instructions, that when executed by the processor, cause the processor to configure a suspension system of the vehicle to an elevated configuration in response to receiving the emergency activation signal.

7. The vehicle of claim 6, wherein the memory further contains instructions, that when executed by the processor, cause the processor to disable an airbag immobilization interlock in response to receiving the emergency activation signal.

8. The vehicle of claim 7, wherein the memory further contains instructions, that when executed by the processor, cause the processor to initiate a video recording upon receiving the emergency activation signal.

9. The vehicle of claim 1, wherein the memory further contains instructions, that when executed by the processor, cause the emergency escape trigger to be activated by a voice command.

10. The vehicle of claim 9, wherein the memory further contains instructions, that when executed by the processor, cause the processor to activate an external audible alert upon receiving the emergency activation signal.

11. The vehicle of claim 10, wherein the memory further contains instructions, that when executed by the processor, cause the processor to activate external visual alert upon receiving the emergency activation signal.

12. A vehicle, comprising:
a drive train;
a steering mechanism;
an onboard computer configured to control the drive train and steering mechanism, an emergency escape trigger coupled to the onboard computer;
wherein the onboard computer comprises:
a processor;
a memory coupled to the processor;
wherein the memory contains instructions, that when executed by the processor, cause the processor to:
receive an emergency activation signal based on one or more indications from the emergency escape trigger;
determine a least resistance path;
render the least resistance path on a synthesized-view vehicle display system;
deactivate a collision avoidance system; and
direct the vehicle along a user-preferred path by controlling the drive train and the steering mechanism.

13. The vehicle of claim 12, wherein the memory further contains instructions, that when executed by the processor, cause the processor to:
obtain the user-preferred path from the synthesized-view vehicle display system; and
receive a user selection between the user-preferred path and the least resistance path.

14. The vehicle of claim 13, wherein the memory further contains instructions, that when executed by the processor, cause the processor to:
receive a user prohibition boundary from the synthesized-view vehicle display system;
recompute the least resistance path based on the user prohibition boundary; and
display the recomputed least resistance path on the synthesized-view vehicle display system.

15. The vehicle of claim 12, wherein the steering mechanism includes a steering wheel, and wherein the emergency escape trigger comprises a button affixed to the steering wheel.

16. The vehicle of claim 12, further comprising a vehicle floor, and wherein the emergency escape trigger comprises a button affixed to the vehicle floor.

17. The vehicle of claim 12, wherein the memory further contains instructions, that when executed by the processor, cause the processor to configure a suspension system of the vehicle to an elevated configuration in response to receiving the emergency activation signal.

18. The vehicle of claim 17, wherein the memory further contains instructions, that when executed by the processor, cause the processor to disable an airbag immobilization interlock in response to receiving the emergency activation signal.

19. The vehicle of claim 18, wherein the memory further contains instructions, that when executed by the processor, cause the processor to stream a video recording to a third party upon receiving the emergency activation signal.

20. A computer program product embodied in a computer-readable medium, comprising machine instructions, that when executed by a processor installed in a vehicle, cause the processor to:
receive an emergency activation signal based on one or more indications from an emergency escape trigger;
obtain a user-preferred path from a synthesized-view vehicle display system of the vehicle;
deactivate a collision avoidance system of the vehicle; and
direct the vehicle along the user-preferred path by controlling a drive train and a steering mechanism of the vehicle.

* * * * *